United States Patent
Tseng

[19]

[11] Patent Number: 6,127,676
[45] Date of Patent: *Oct. 3, 2000

[54] PHOTO SENSING DEVICE WITH MEANS TO ELIMINATE LIGHT BEAM INTERFERENCE

[76] Inventor: Hsin Te Tseng, 4F, No. 19, Shih-Chien St., Pei-Tou, Taipei, Taiwan

[*] Notice: This patent is subject to a terminal disclaimer.

[21] Appl. No.: 09/133,190

[22] Filed: Aug. 13, 1998

Related U.S. Application Data

[63] Continuation-in-part of application No. 09/027,316, Feb. 28, 1998, Pat. No. 5,969,344.

[51] Int. Cl.[7] .................................................. G01D 5/34
[52] U.S. Cl. .................................. 250/231.13; 250/239
[58] Field of Search ........................ 250/231.13, 231.14, 250/231.16, 231.17, 231.18, 239, 216, 232; 356/373, 460; 33/707

[56] References Cited

U.S. PATENT DOCUMENTS

5,969,344  10/1999  Tseng ................................. 250/231.13

*Primary Examiner*—Seungsook Ham
*Assistant Examiner*—Kevin Pyo
*Attorney, Agent, or Firm*—Rosenberg, Klein & Lee

[57] ABSTRACT

An improved photo sensing device is provided that includes at lest one light source, at least one photo detector and an optical chopper. A cone-shaped surface, or two or four inclined planes are provided on the periphery of the detector to eliminate interference from the work beam impinging upon the photo detector. By that arrangement, the photo sensor is not influenced by scattered light.

3 Claims, 13 Drawing Sheets

PHOTO SENSING DEVICE WITH MEANS TO ELIMINATE LIGHT BEAM INTERFERENCE

REFERENCE TO RELATED PATENT APPLICATIONS

This Application is a Continuation-in-Part of patent application Ser. No. 09/027,316, filed on Feb. 28, 1998, now U.S. Pat. No. 5,969,344.

FIELD OF THE PRESENT INVENTION

The present invention relates to an improved photo sensing means, more particularly, to a photo sensing means which will not be influenced by scattered light.

BACKGROUND OF THE PRESENT INVENTION

Figure 1:
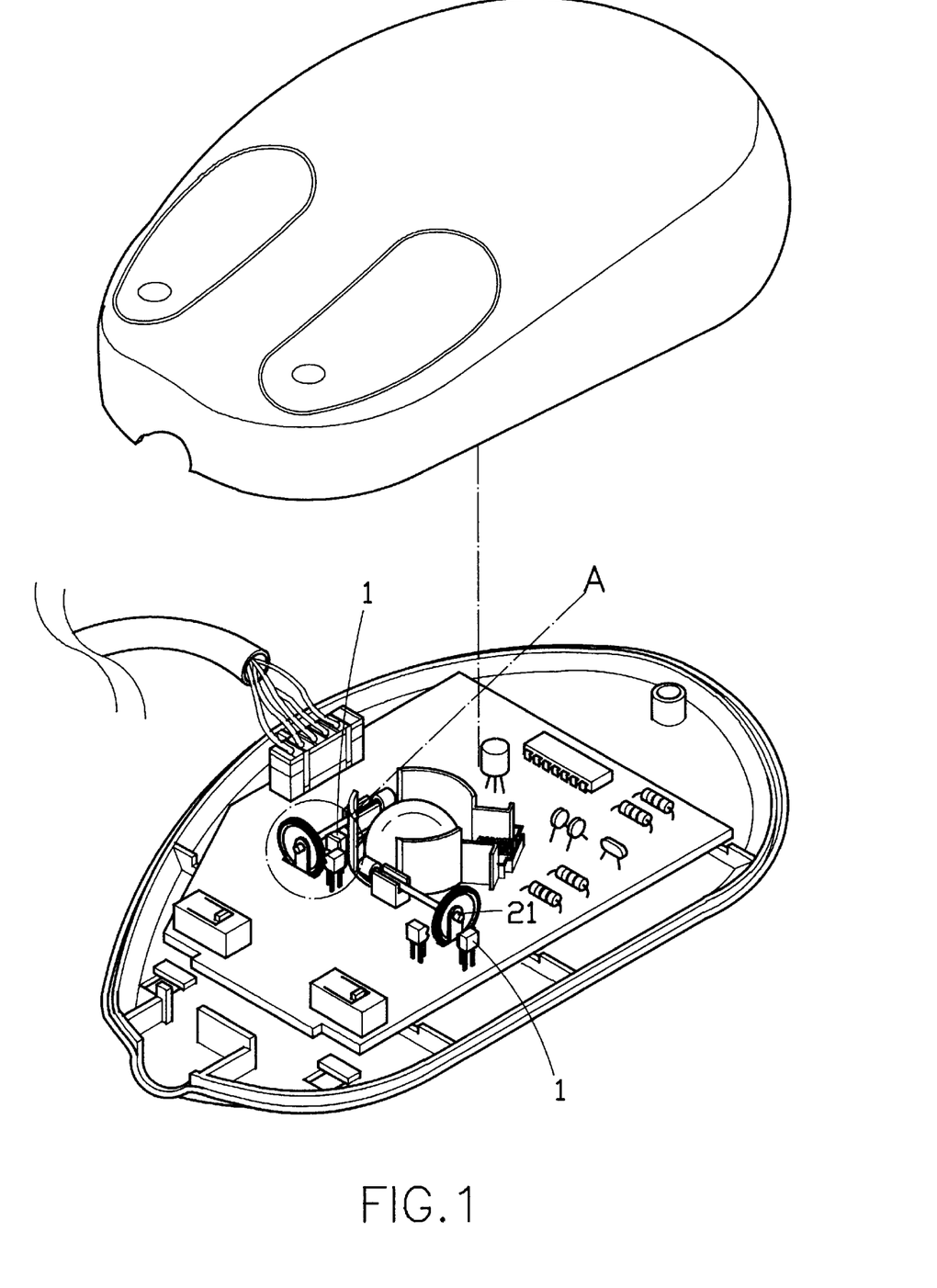
FIG. 1 shows the perspective view of a photo sensing means in conventional art.
Figure 1A:
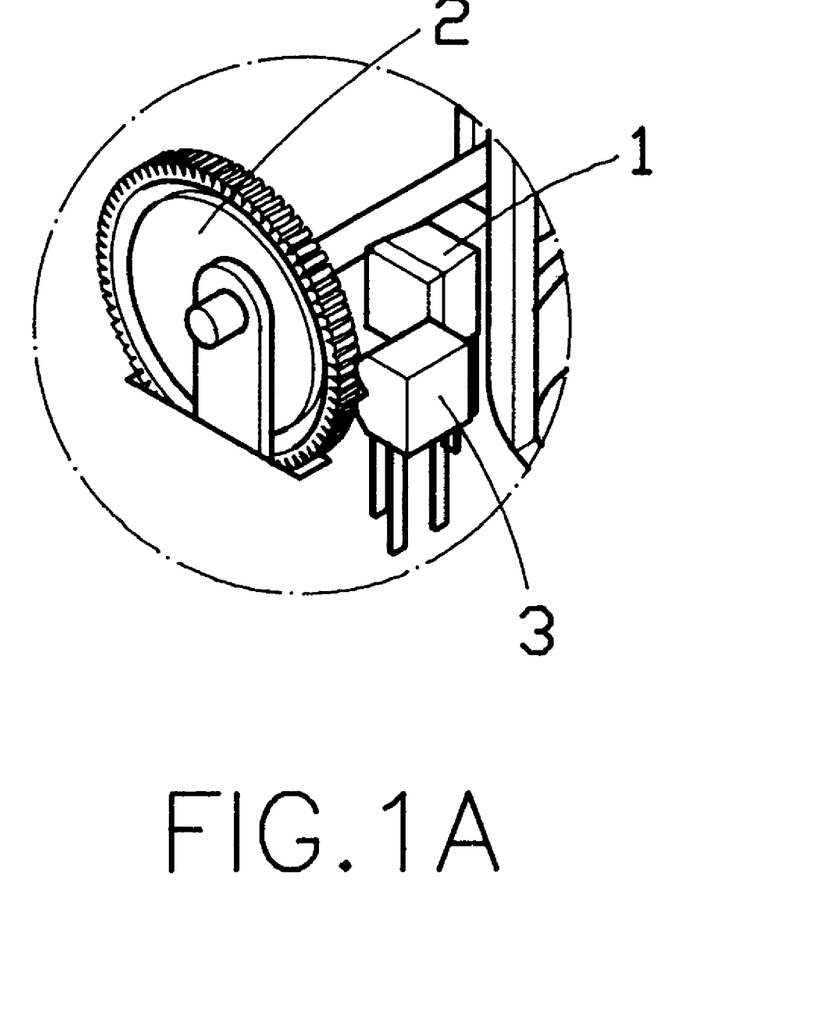
FIG. 1A is the partial enlargement of FIG. 1 part A.
Figure 2:
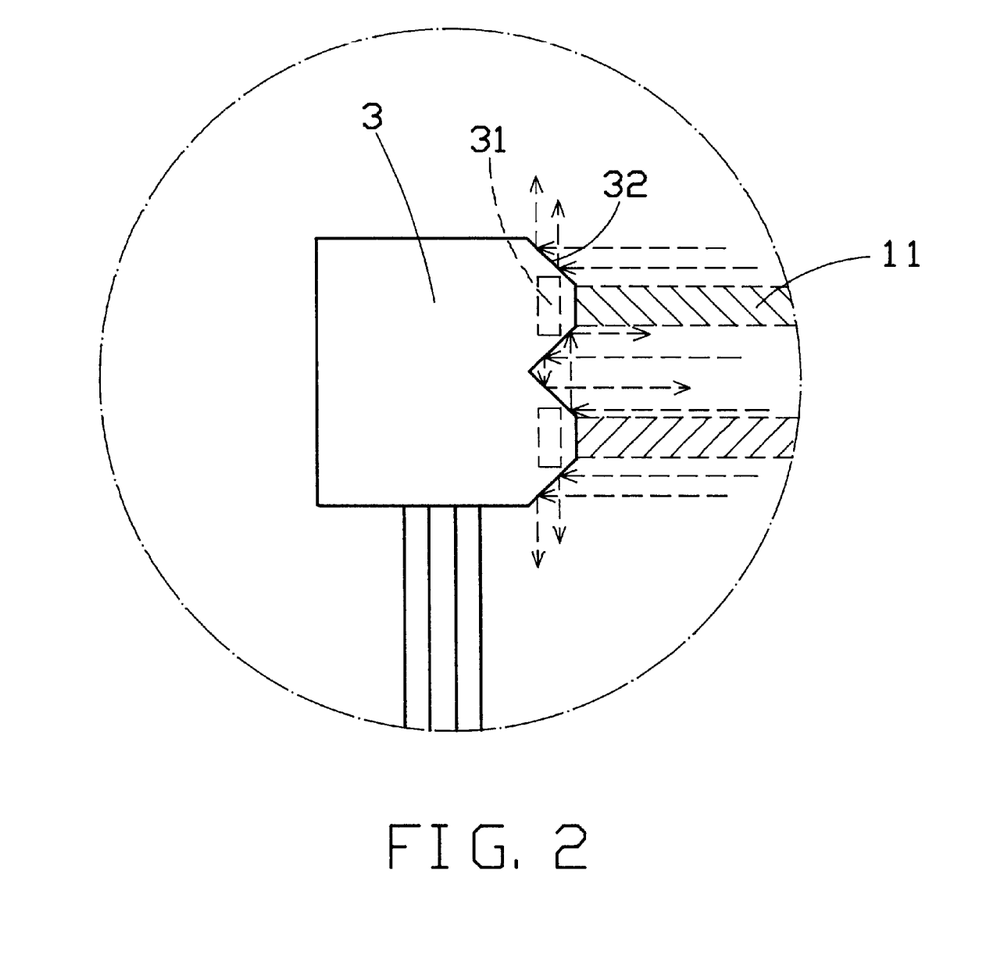
FIG. 2 is the schematic diagram illustrating the projection of work beam onto the photo detector.

As shown in FIG. 1, FIG. 1A and 2, the conventional photo sensing device comprises at least one light source 1, a photo detector 3 and an optical chopper 2. The light source 1 is placed in the proximity of the chopper 2, therefore the light emitted from the light source 1 can impinge upon the chopper 2. The photo detector 3 is placed near the perimeter of the chopper and contains a photo sensing chip 31 to receive the work beam 11 reflected from the chopper 2. Moreover, two or four inclined planes 32 are provided on the periphery of the chip 31 to eliminate the interference of work beam 11 when impinging upon the photo detector.

The present invention is intended to provide an improved photo sensing device to further eliminate the interference of the light from light source when work beam impinges upon the photo detector.

To achieve the above object, the photo sensing device according to the present invention provides a cone-shaped surface, two inclined surfaces or four inclined surfaces on the light-impinging surface of the photo-sensing chip. Moreover, a light-absorbing material can be applied to the inclined surfaces to eliminate the interference from reflected light.

The various objects and advantages of the present invention will be more readily understood from the following detailed description when read in conjunction with the appended drawing, in which:

NUMERAL 1 light source
 11 work beam
2 optical chopper
 20 actuating means
 22 transparent portion
 23 opaque portion
3 photo detector (phototransistor)
 31 photo sensing chip
 32 inclined surface
 33 cone surface
 34 light absorbing materials
4 cover
 41 aperture

DETAILED DESCRIPTION OF THE PREFERRED EMBODIMENT

Figure 3:
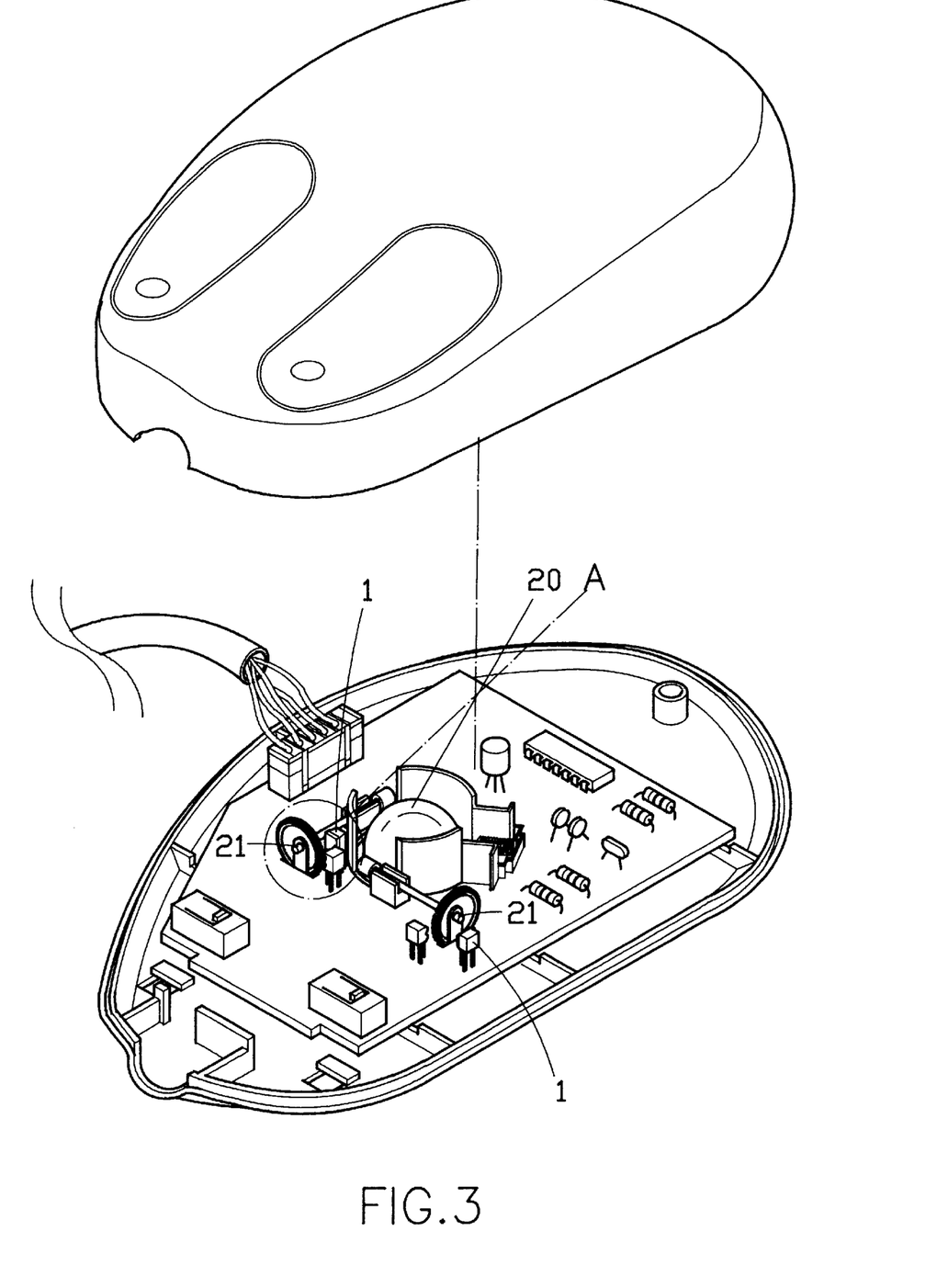
FIG. 3 shows a preferred embodiment of the present invention.
Figure 3A:
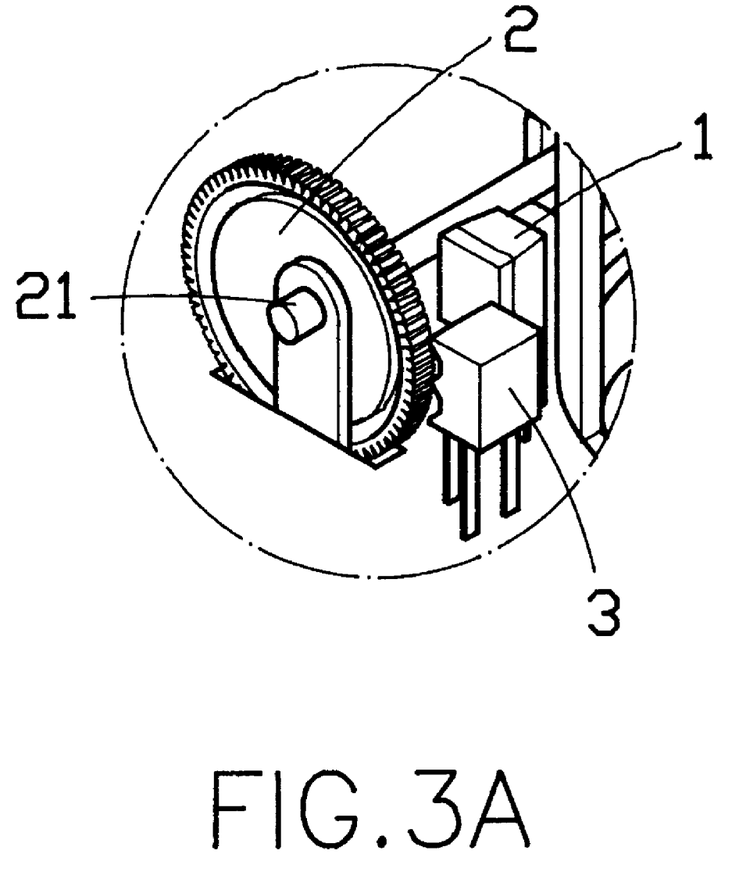
FIG. 3A is the partial enlargement of FIG. 3 part A.
Figure 5:
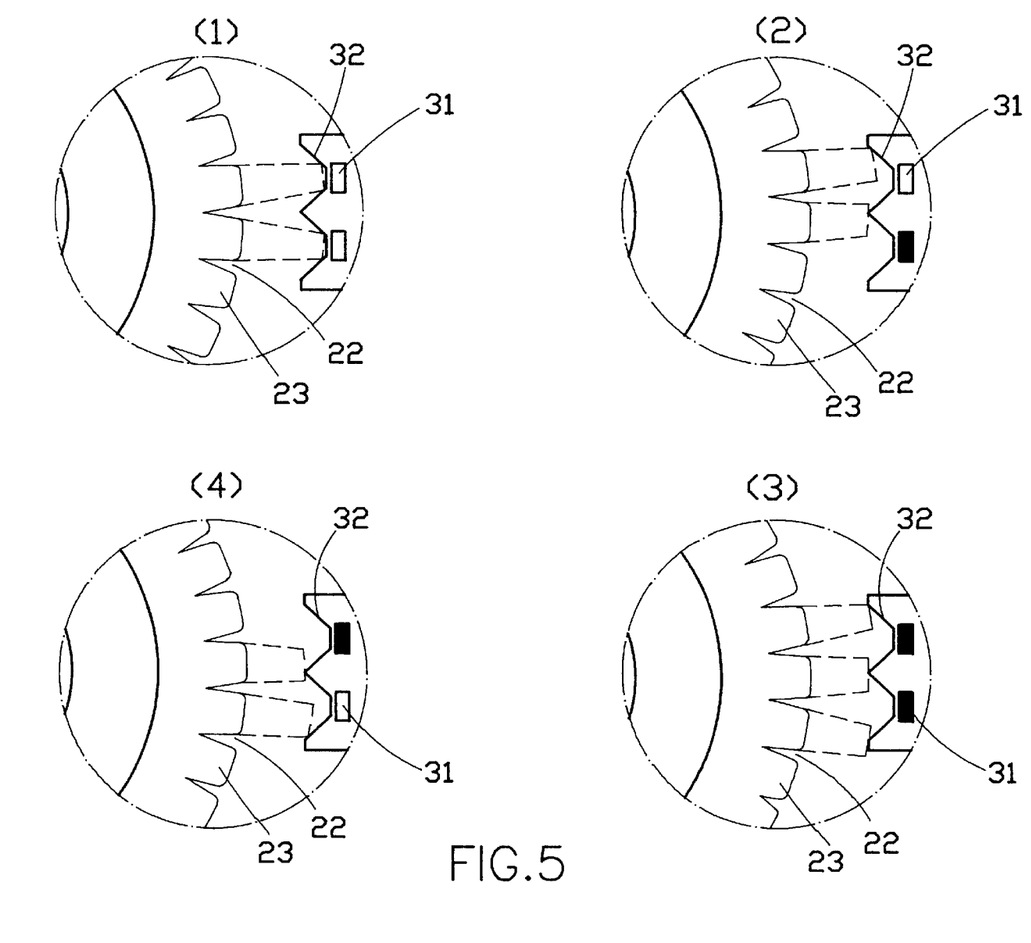
FIG. 5 illustrate the generation of (0,0), (0,1), (1,1), (1,0) signals by rotation of the optical chopper according to the present invention.

With reference now to FIG. 3, FIG. 3A and FIG. 5, the improved photo sensing device comprises at least one light source 1, at least one photo chopper 2, and at least one photo detector 3. More particularly, the light source 1 is placed in proximity of the optical chopper 2 to facilitate impingement of the light thereof upon the optical chopper 2. The optical chopper 2 is arranged rotatably on a shaft 21 and driven by an actuating means 20 (trajectory ball means).

More particularly, the shaft 21 is in contact with the ball 20 and the shaft 21 will rotates when the ball 20 rolls. Therefore, the photo chopper 2 will in turn rotate. Moreover, a plurality of transparent portions 22 are provided on the perimeter of the photo chopper 2, and an opaque portion 23 is placed between two transparent portions 22.

Figure 4:
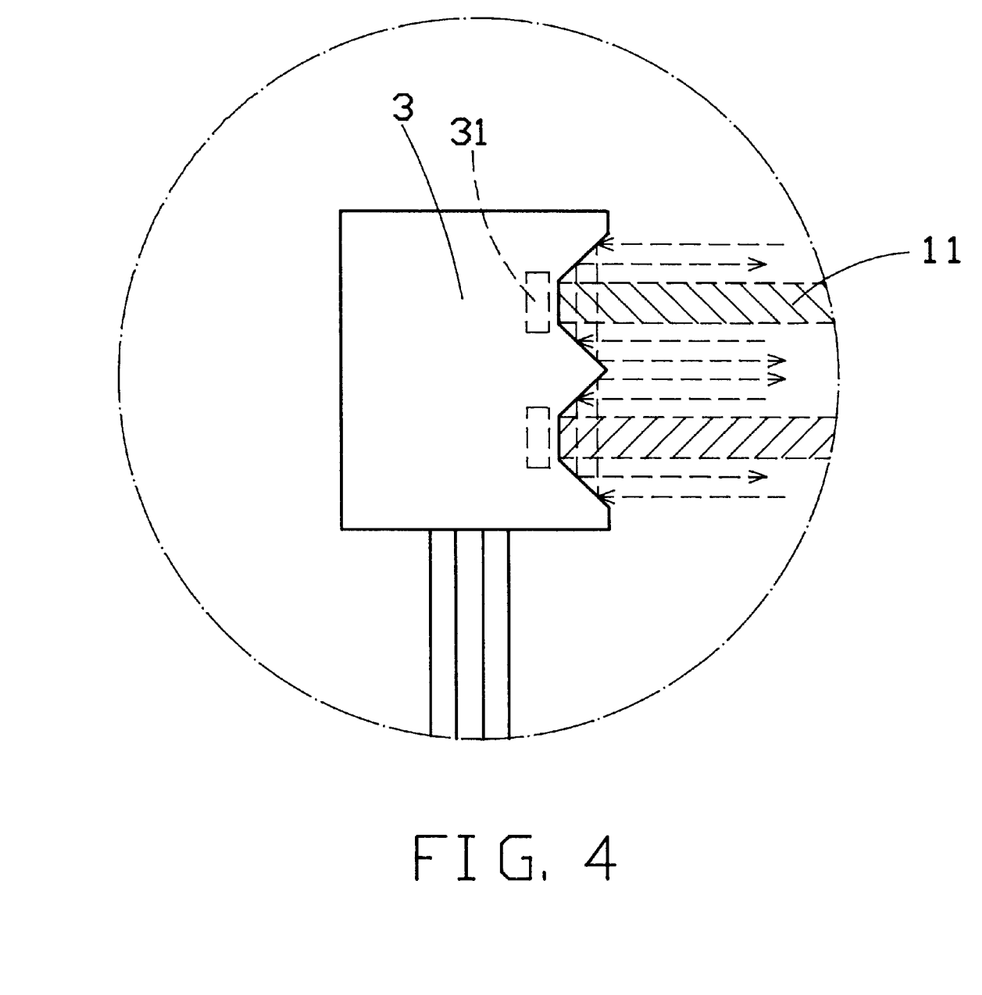
FIG. 4 shows the projection of work beam onto the photo detector in FIG. 3.

The photo detector 3 is made of transparent materials and placed opposite to the light source 1 at the perimeter of the photo chopper 2. Two adjacent photo sensing chips 31 are arranged within the photo detector 3 to receive the work beam coming from the transparent portion 22. The light impinging surface of the photo detector 3 is, around the perimeter of the chip 31, provided with two or four inclined surfaces 32. The inclined surfaces 32 can be further coated with light-absorbing or light-reflecting materials to eliminate the light scattering from the inclined surfaces, as shown in FIG. 4. As can be seen from FIG. 4, the light reflected from the inclined surface will not influence the detection of the photo sensing chip 1.

The light emitted from the light source 1 will be chopped by the transparent and opaque portion of the optical chopper 2 to form a work beam 11. As shown in FIG. 5, the work beam 11 is received by the photo sensing chip 31 and then converted to (0,0), (0,1), (1,1), (1,0) signals by a rectifying circuit if the optical chopper 2 rotates continuously.

Figure 6:
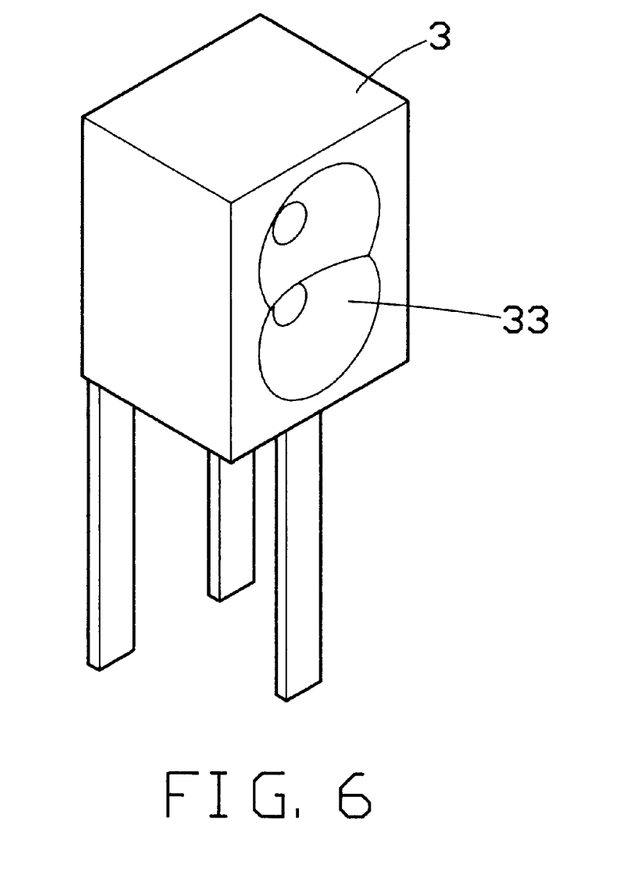
FIG. 6 is a view showing the application of the invention means.

FIG. 6 shows the application of the inventive means. As shown in this figure, a concave cone surface 33 is provided around the chip 31. The work beam impinging upon the photo detector 3 will be received by the chip 31 or reflected by the concave cone surface 33. Therefore, the chip 31 will not be influenced by the scattered light.

Figure 7:
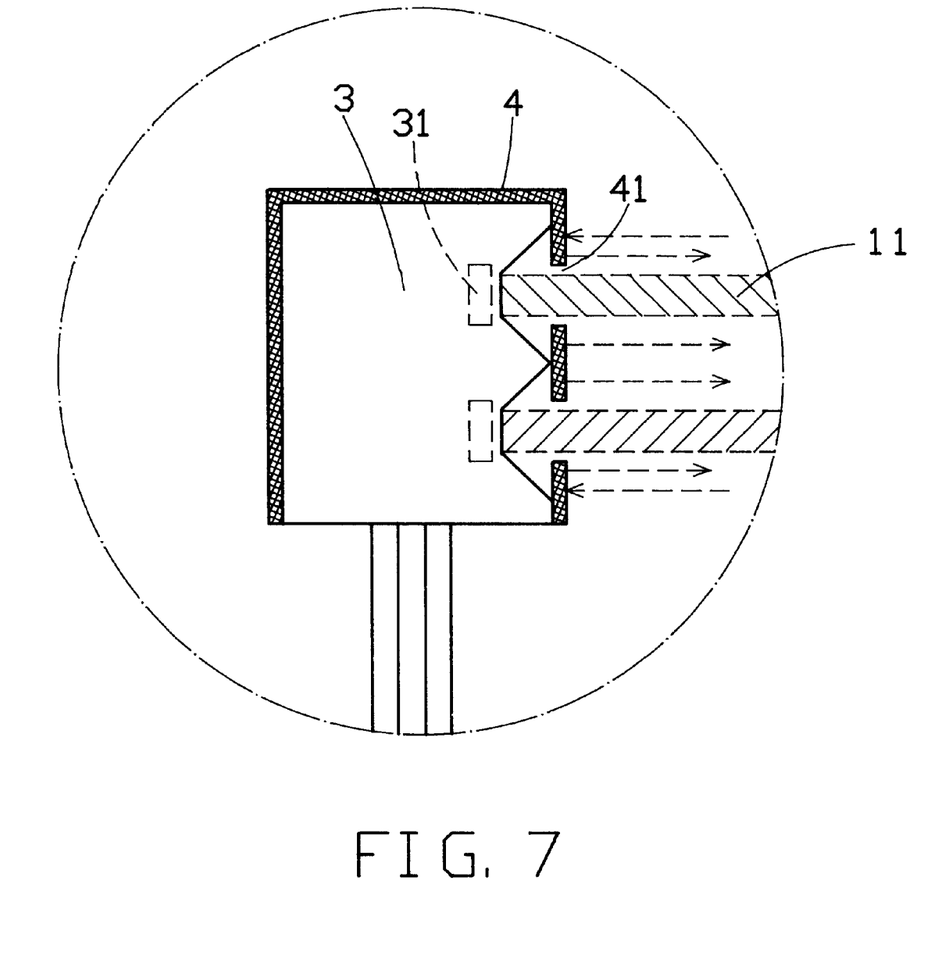
FIG. 7 is a view.

FIG. 7 shows another application of the inventive means. The photo detector 3 is enclosed with a cover 4 made of light-reflecting or light absorbing material.

Moreover, an aperture 41 is form on the cover 4 and in front of the chip 31. The cover 4 can also function to filter out the scattered light.

Figure 7A:
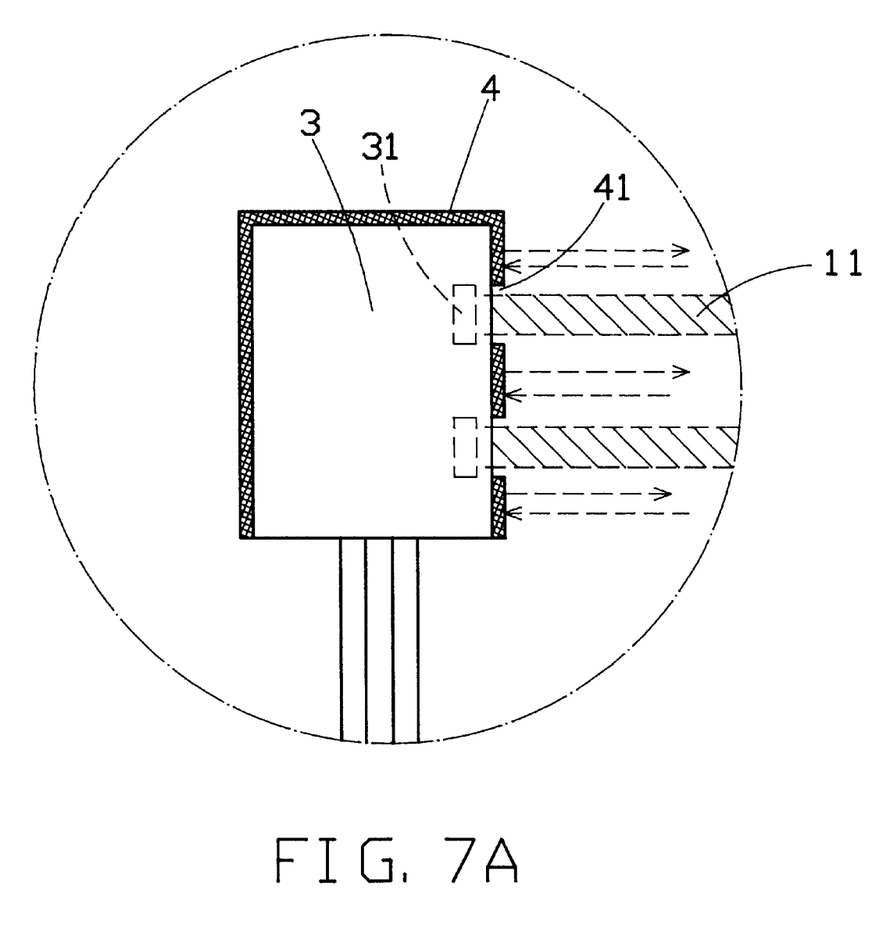
FIG. 7A is a view showing the application of the photo detector without inclined surface of FIG. 7.

Moreover, as shown in FIG. 7A, an opaque cover 4 with two apertures 41 is used to enclose the photo detector 3 with no inclined surface. The aperture 41 is in front of the corresponding chip 31.

Figure 7B:
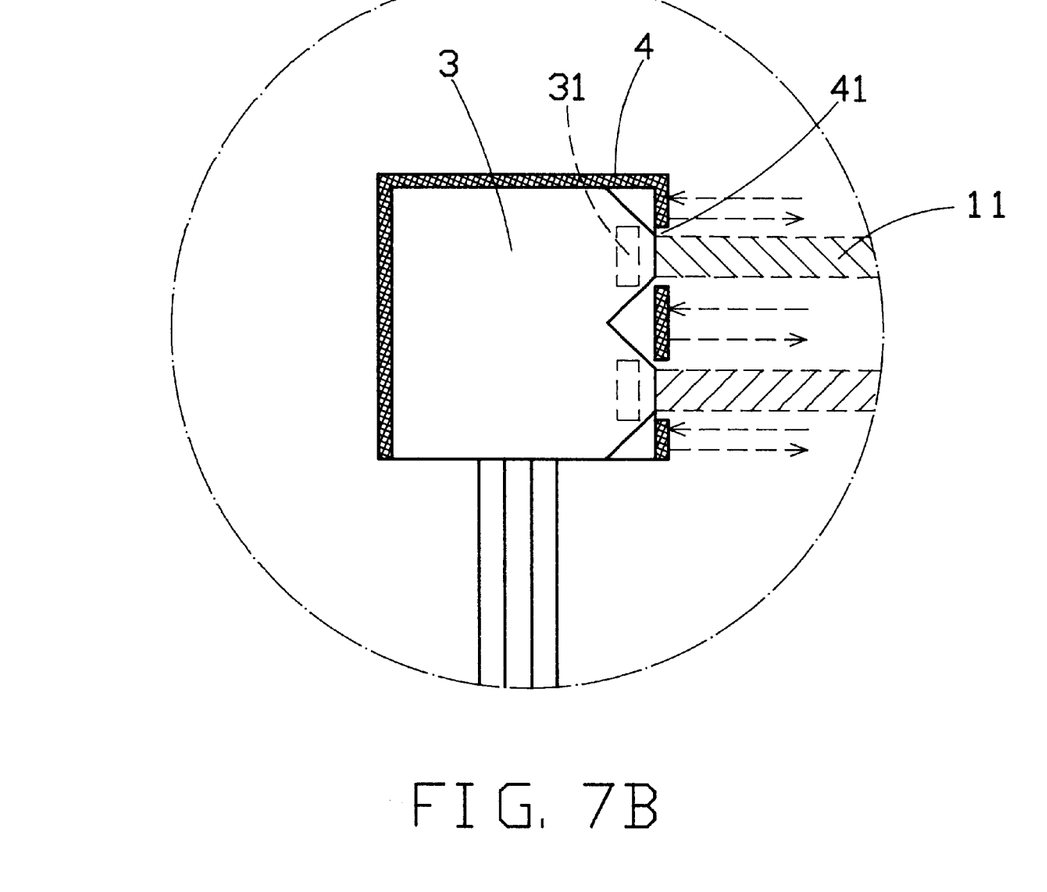
FIG. 7B is a view showing the application of the photo detector of FIG. 2.

As shown in FIG. 7B, an opaque cover 4 with two apertures 41 is used to enclose the photo detector 3 with inclined surface. The aperture 41 is in front of the corresponding chip 31.

Figure 8:
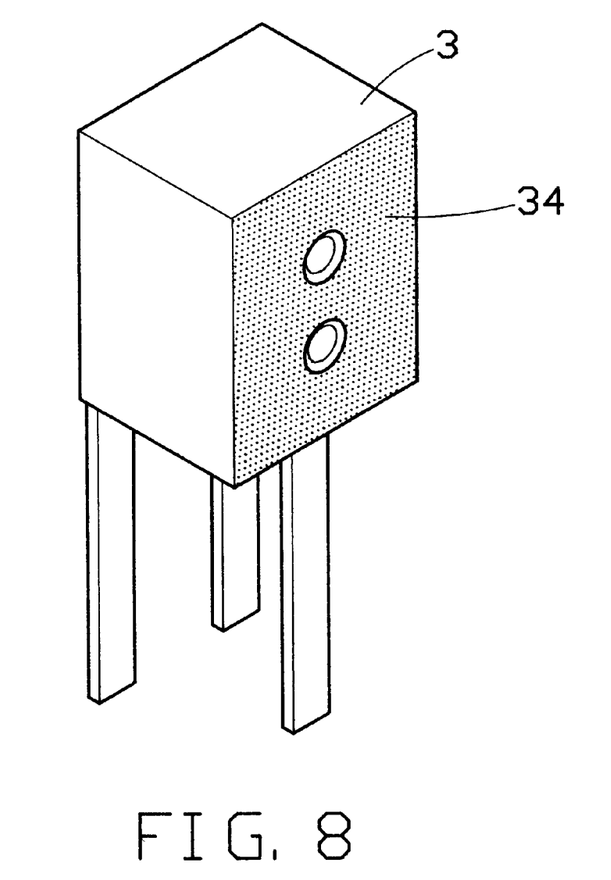
FIG. 8 is still another view showing the application of the inventive photo detector.

With reference now to FIG. 8, the light-impinging surface of the photo detector 3 is coated with (by printing or plating) light-absorbing or lightreflecting materials 34, therefore, the scattered light will be absorbed or reflected by material 34 and not influence the detection of the photo detector 3.

Figure 8A:
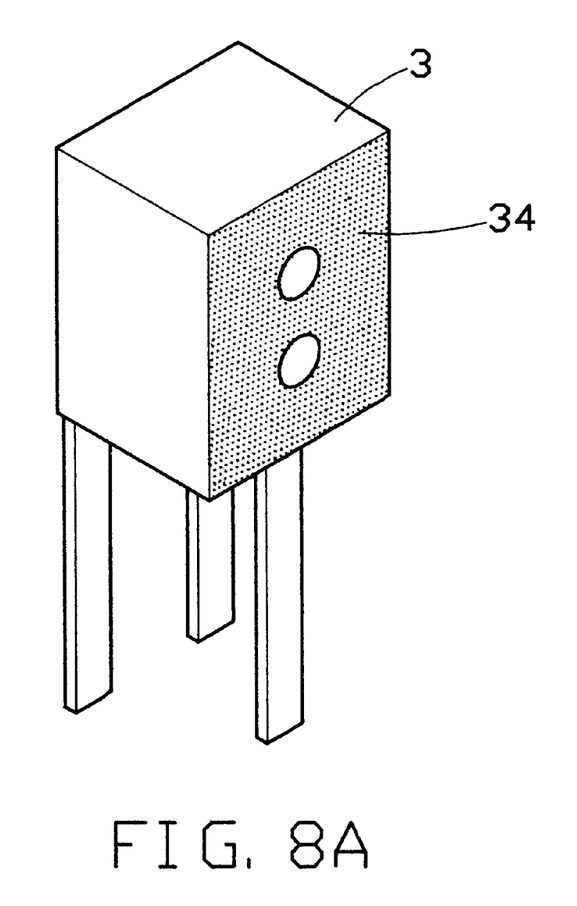
FIG. 8A is a view showing the application of the inventive photo detector without inclined surface of FIG. 8.

With reference now to FIG. 8A, a light-absorbing or light-reflecting material 34 is applied (by printing, coating or plating ) to the photo detector 3 without cone-shaped surface.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An improved photo sensing device comprising at least one light source, at least one photo detector and an optical chopper, said light source being located in proximity of said optical chopper such that light emitted from said light source impinges upon said optical chopper, said photo detector being located near a perimeter of the optical chopper and containing a photo sensing chip to receive a work beam reflected from said chopper, said photo detector having a light-impinging surface extending about a periphery of said photo sensing chip, said light-impinging surface having a contour selected from the group consisting of at least two inclined planes inclining toward said photo sensing chip, a cone-shaped surface, and a concave surface to eliminate interference of said work beam when impinging upon said photo detector.

2. The improved photo sensing device as in claim 1, further comprising a cover with two apertures to cover the light-impinging surface, wherein said aperture is in front of said photo sensing chip.

3. The improved photo sensing device as in claim 1, wherein the light-impinging surface of said photo detector is coated with, by printing or plating, one of a light-absorbing or light-reflecting material.

\* \* \* \* \*